United States Patent [19]

Wescott et al.

[11] Patent Number: 4,969,796
[45] Date of Patent: Nov. 13, 1990

[54] METHOD AND APPARATUS FOR COOLING SHAFT SEALS

[75] Inventors: Kermit R. Wescott, Winter Springs; William L. McCarty, West Chester; Louis R. Wood, Longwood, all of Fla.

[73] Assignee: Westinghouse Electric Corp., Pittsburgh, Pa.

[21] Appl. No.: 429,109

[22] Filed: Oct. 30, 1989

[51] Int. Cl.$^5$ .............. F16J 15/00; F01P 7/00; F01D 5/00
[52] U.S. Cl. ..................................... 415/110; 415/180
[58] Field of Search ............... 415/180, 177, 175, 110, 415/111, 112, 24, 26; 290/52; 277/15, 16, 22

[56] References Cited

U.S. PATENT DOCUMENTS

| | | | |
|---|---|---|---|
| 2,303,381 | 12/1942 | New | 290/52 |
| 3,210,553 | 10/1965 | Cummings | 290/52 |
| 3,604,206 | 9/1971 | Baily | 277/15 |
| 3,728,857 | 4/1973 | Nichols | 415/110 |
| 3,758,226 | 9/1973 | Gyurech | 415/110 |
| 3,976,165 | 8/1976 | Pilarczyk | 415/110 |
| 4,005,580 | 2/1977 | Swearingen | 277/15 |
| 4,477,223 | 10/1984 | Giroux | 415/110 |

Primary Examiner—Edward K. Look
Assistant Examiner—Hoang Nguyen

[57] ABSTRACT

Method and apparatus for cooling shaft seals of a turbine-generator system which includes a hydrogen inner-cooled generator having a stator with a cylindrical core and a rotor mounted for rotation on a shaft within the cylindrical core, a turbine coupled to the shaft at one end of the generator, an exciter coupled to the shaft at the other end of the generator, and a pair of seals each of which surround the shaft at both ends of the generator for substantially minimizing a leakage of hydrogen therefrom. Each of the seals includes a seal ring with a hydrogen side and an air side, and a closed loop oil supply is provided for each such side. One closed loop oil supply supplies oil to the hydrogen side of each of the seals, and another closed loop oil supply supplies oil to the air side of each of the seals, and both oil supplies are coupled within a heat exchanger for exchanging heat between the two closed loop oil supplies.

20 Claims, 4 Drawing Sheets

METHOD AND APPARATUS FOR COOLING SHAFT SEALS

BACKGROUND OF THE INVENTION

1. Field of the Invention

This invention relates generally to shaft seals that are used in hydrogen inner-cooled turbine-generators, and more particularly to methods and apparatus for cooling the shaft seals in such turbine-generators.

2. Statement of the Prior Art

Conductor cooling is a conventional process used in very large turbine-generator systems for dissipating the armature and field coil losses of the turbine-generators to cooling media within their coil insulation wall. The turbine-generators using such conductor cooling are also referred to variously as "inner-cooled," "supercharged," or "direct-cooled", and the cooling medium that is most often used in such turbine-generators is hydrogen.

Hydrogen inner-cooled turbine-generators typically operate in a pressurized hydrogen atmosphere that provides cooling for all of the turbine-generator except, in some instances, its armature coils. Such hydrogen inner-cooled turbine-generators are often operated at 60 lbf/in$^2$ (i.e., about 4219 grams per square centimeter) or more in order to increase the mass flow of the hydrogen, and to reduce its temperature rise.

In order to minimize leakage of pressurized hydrogen cooling medium from an operational turbine-generator, shaft seals are typically used in hydrogen inner-cooled turbine-generators for maintaining an oil film under pressure in a small clearance between the rotating shaft of the turbine-generator and a stationary member surrounding the shaft at both ends of the turbine-generator. The construction of such shaft seals may be similar to a journal bearing with a cylindrical oil film or similar to a spring-loaded thrust bearing with the oil film in a plane at right angles to the shaft axis. In either case, the oil film is maintained by an oil supply pressure that is higher than the hydrogen pressure.

Oils used in such shaft seals can absorb about 10% by volume of either hydrogen or air. It is important that the flow of oil in those shaft seals toward their hydrogen side be minimized in order to reduce both the amount of air that is carried into the hydrogen inner-cooled turbine-generator and the amount of hydrogen that is carried out. Moreover, it is important to minimize temperature differences between the "hydrogen side" of the shaft seal and its "air side" so that differential thermal expansion of the seal ring which comprises the stationary member can be minimized.

Prior art shaft seals have typically employed separate supplies of oil for their hydrogen side and their air side, each such oil supply including a heat exchanger operated in one of two general fashions. One method selects a cooling media (e.g., water), and carefully sizes the heat exchanger of each oil supply to provide for open loop control of seal oil temperatures at the outlets on either side of the shaft seals. Any problems with heat exchanger fouling, decreased oil flow or decreased water flow when experienced with this method requires recognition and subsequent correction by an operator.

Another method utilizing separate heat exchangers for the hydrogen side and the air side of prior art shaft seals provides automated control valves to sense the temperature difference between the hydrogen side oil supply and the air side oil supply, and operates the particular heat exchanger in the oil supply having the higher temperature. Not only is this other method complicated in its design by virtue of the additional components that are required (e.g., two heat exchangers and many automated control valves), but it is also difficult in its implementation due to the necessity for precise, reliable components to accomplish such control over a very narrow temperature range.

SUMMARY OF THE INVENTION

Accordingly, it is a general object of the present invention to avoid such problems in turbine-generator systems of the hydrogen inner-cooled type. It is a more particular object of the present invention to provide an improved method and apparatus for cooling shaft seals in such turbine-generator systems.

It is another object of the present invention to provide a simplified, less expensive method and apparatus for cooling shaft seals in hydrogen inner-cooled turbine-generator systems which minimizes use of automated control valves and precise temperature measuring equipment.

It is yet another object of the present invention to provide a closed loop method and apparatus for cooling shaft seals in hydrogen inner-cooled turbine generator systems.

Briefly, these and other objects according to the present invention are accomplished by a turbine-generator system which generally comprises a hydrogen inner-cooled generator having a stator with a cylindrical core and a rotor mounted for rotation on a shaft within the cylindrical core, a turbine coupled to the shaft at one end of the generator, an exciter coupled to the shaft at the other end of the generator, and a pair of seals each of which surround the shaft at both ends of the generator for substantially minimizing a leakage of hydrogen therefrom.

Each of the pair of seals comprise a seal ring with a hydrogen side and an air side, and a closed loop oil supply is provided for each such side. In accordance with one important aspect of the present invention, first oil supply means for supplying oil to the hydrogen side of each of the seals, and second oil supply means for supplying oil to the air side of each of the seals are both coupled within heat exchanger means for exchanging heat between the two closed loop oil supplies. Any temperature differences between the first oil supply means and the second oil supply means are, thus, minimized. Moreover, differential thermal expansion of the seal ring is substantially prevented for ultimately minimizing leakage of hydrogen around the rotating shaft.

Other objects, advantages and novel features according to the present invention will become more apparent from the following detailed description of its preferred embodiment, that may be considered in conjunction with the accompanying drawings wherein:

DETAILED DESCRIPTION OF THE PREFERRED EMBODIMENT

Figure 1:
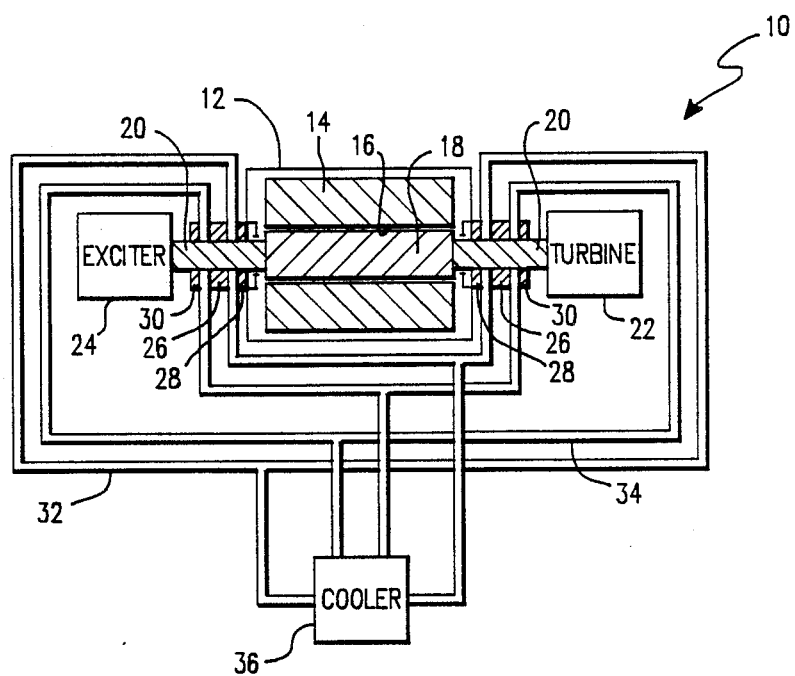
FIG. 1 is a simplified block diagram of a turbine-generator system according to the present invention.

Referring now to the drawings, wherein like element numbers designate like or corresponding parts throughout each of the several views, FIG. 1 shows a simplified block diagram of a turbine-generator system 10 in accordance with the present invention. The system 10 includes a generator 12 of the hydrogen inner-cooled type that has a stator 14 with a cylindrical core 16 and a rotor 18 that is mounted for rotation on a shaft 20 within the core 16. A turbine 22 is coupled to the shaft 20 at one end of the generator 12, and an exciter 24 is coupled to the shaft 20 at the other end of the generator. The turbine 22 may suitably comprise a combustion turbine, for example, a Model 501F combustion turbine manufactured by the assignee of the present invention, or any other conventional turbine that is adapted to be coupled to a conventional hydrogen inner-cooled generator for generation of power thereby.

A pair of seals 26, each of which surround the shaft 20 at both ends of the generator 12 are provided in order to substantially minimize any leakage of hydrogen from the generator 12. The generator 12 is conventionally operated at 60 lbf/in$^2$ (i.e., about 4219 grams per square centimeter) or more in order to increase the mass flow of hydrogen therein, and to reduce its temperature rise. Each of the seals 26 conventionally comprise a seal ring with a hydrogen side 28 and an air side 30.

In accordance with one important aspect of the present invention, a closed loop oil supply is provided for both of the hydrogen sides 28 and air sides 30. A first oil supply means 32 supplies oil through a closed loop to the hydrogen side 28 of each of the seals 26, while a second oil supply means 34 supplies oil through another closed loop to the air side 30 of each of the seals 26. The first and second oil supply means 32, 34 are coupled within a heat exchanger means 36 which comprises a hydrogen side seal oil cooler in order to exchange heat therebetween. Accordingly, any temperature differences between the first oil supply means 32 and the second oil supply means 34 are, thus, minimized.

Figure 2:
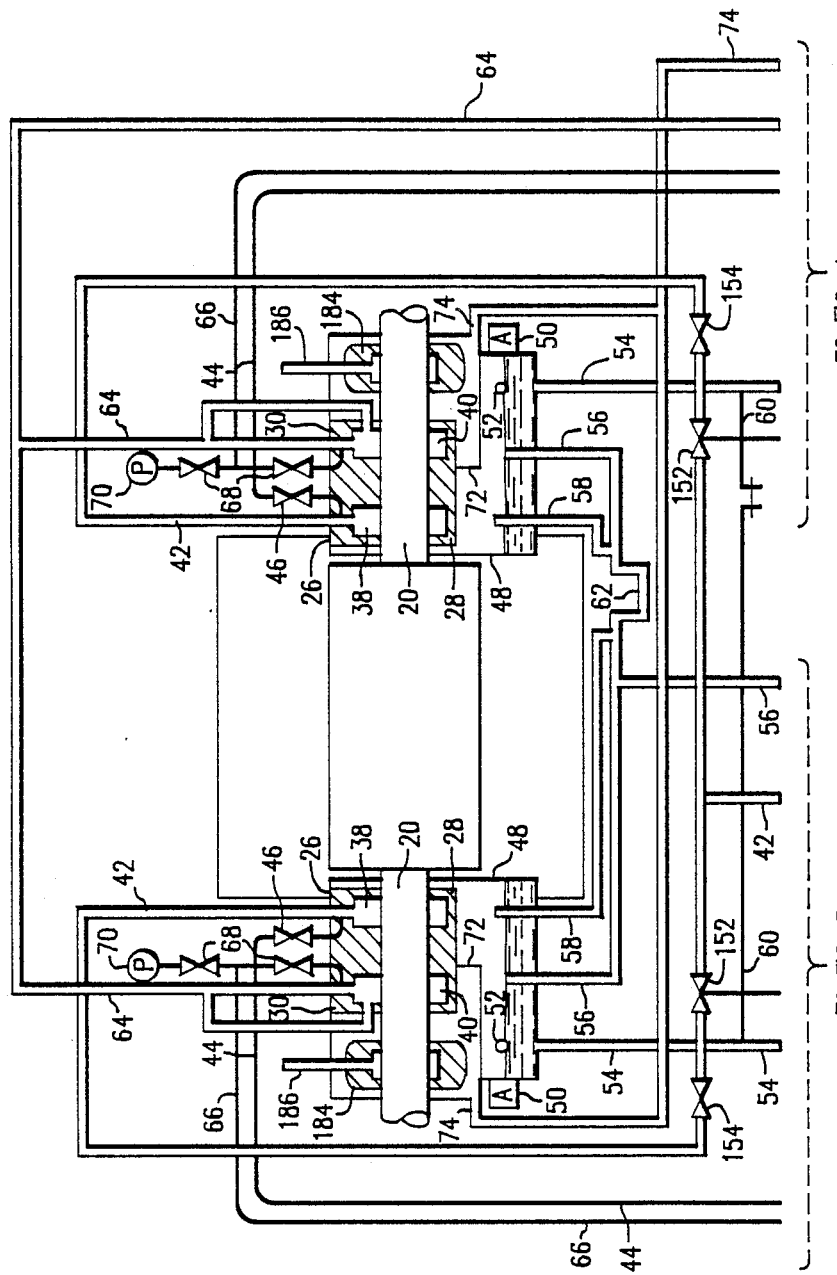
FIG. 2 is a detailed schematic of the hydrogen inner-cooled generator and shaft seals shown in FIG. 1.

Details of the system 10 according to the preferred embodiment of the present invention will now be discussed with reference to FIGS. 2-4. As is shown in FIG. 2, each of the seals 26 include a pair of annular-shaped chambers, one 38 of which is on the hydrogen side 28, and the other 40 of which is on the air side 30. Seal oil is provided to the chambers 38 on the hydrogen side 28 of each seal 26 via branched hydrogen side seal oil feed lines 42, and the seal oil thus provided is utilized in a conventional manner in both seals 26 to minimize any leakage of hydrogen from the generator 12 around its rotating shaft 20. A gauge line 44 with a gauge line cutout valve 46 is also provided for each of the chambers 38 for purposes of pressure equalization as will be explained in greater detail herein below.

Seal oil entering each chamber 38 from the feed lines 42 drains to a separate defoaming tank 48 which has a high level alarm 50 that is connected to a float 52, a defoaming tank drain line 54, a hydrogen side seal oil drain line 56, and a vent line 58. Each defoaming tank drain line 54 also includes a gas pressure sensing line 60 for sensing the gas pressure within the defoaming tank 48. The seal oil drain lines 56 are coupled together as shown, and include a trap 62, on both sides of which the vent lines 58 are connected thereto.

Seal oil is also provided to each of the chambers 40 on the air side 30 of each seal 26 via branched air side seal oil feed lines 64. A gauge line 66 having a pair of gauge cutout valves 68 and a pressure gauge 70 with a range of about zero to one hundred psig (i.e., 0-7031 grams per square centimeter gauge) is also provided for the monitoring of air side seal oil pressure. Seal oil which enters the chambers 40 from the feed lines 64 collects in a sump 72 which drains through a bearing oil drain line 74.

Figure 3:
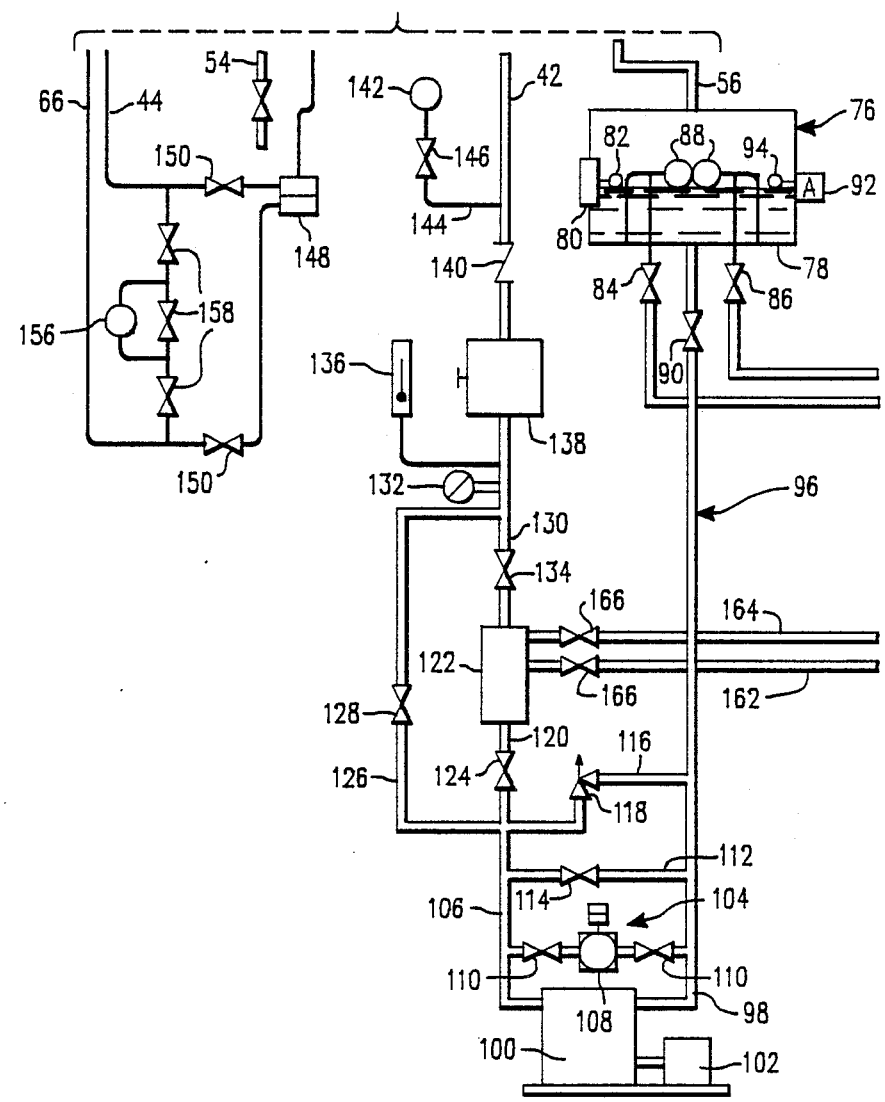
FIG. 3 is a detailed schematic of the first oil supply means and cooler shown in FIG. 1.

Referring now to FIG. 3, it can be seen that the hydrogen side seal oil drain line 56 drains to regulator means 76 comprising a tank 78, an oil level gauge 80 with a float 82, a pair of valves 84, 86 which are operated by way of floats 88 for controlling the level of seal oil in the tank 78, another valve 90 for isolating the tank 78 to stop a flow of seal oil through the first oil supply means 32 (FIG. 1), and a hydrogen side low-level alarm 92 with a float 94. Both valves 84, 86 are normally closed. Valve 84 is adapted to open when its float 88 reaches a selected high level of seal oil within the tank 78, while valve 86 is adapted to open when its float 88 reaches a selected low level of seal oil within the tank 78. Conventional jacks (not shown) are provided for both valves 84, 86 in order to open or close those valves 84, 86 in an emergency.

Valve 90 is normally open, and it drains to a branched hydrogen side seal oil cooler line 96 which is connected by one 98 of its branches to a hydrogen side seal oil pump 100 that is driven by a motor 102. A pressure sensing line 104 is coupled between the inlet branch 98 of the pump 100 and a discharge line 106 thereof to detect when the pump 100 is off. Accordingly, the pressure sensing line 104 includes a pressure switch 108 with a pair of isolation valves 110. The pressure switch 108 is adapted to close when differential pressure between the inlet branch 98 and the discharge line 106 decreases to five psi (i.e., about 352 grams per square centimeter). Upon such closure, the pressure switch 108 is also adapted to initiate a "HYDROGEN SIDE SEAL OIL PUMP-OFF" alarm.

A second branch 112 of the cooler line 96 includes a throttling valve 114 which is used for throttling flow of the seal oil through the hydrogen side seal oil pump 100, while a third branch 116 of the cooler line 96 includes a pressure relief valve 118 which is used for relieving any excess pressure within the supply of hydrogen side seal oil above a predetermined limit. For example, a pressure limit of about 110 psig (i.e., about 7734 grams per square centimeter gauge) has been found suitable for use with the Westinghouse Model 501F combustion turbine-generator system manufactured by the assignee of the present invention.

The cooler line 96 also includes a first inlet 120 to a hydrogen side seal oil cooler 122, having a cooler isolation valve 124, and a hydrogen side seal oil cooler bypass line 126 having a bypass cutout valve 128. Seal oil from the hydrogen sides of both shaft seals 26 (FIGS. 1 and 2) is circulated through the hydrogen side seal oil cooler 122 via its first inlet 120, and is discharged therefrom by a first outlet 130. The first outlet 130 from the hydrogen side seal oil cooler 122 includes a temperature monitoring thermocouple 132, and a thermometer 136 for detecting the temperature of the hydrogen side seal oil leaving the hydrogen side seal oil cooler 122, a filter 138 for filtering such seal oil as it leaves the hydrogen side seal oil cooler 122, a check valve 140 for preventing back flow of the seal oil, and a hydrogen side seal oil pressure gauge 142 coupled to the first outlet 130 through a gauge line 144 and gauge cutout valve 146. The seal oil thermometer 136 suitably comprises a range of from about 30° F. to about 180° F. (i.e., from about −1° C. to about 82° C.), since the normal oil temperature is about 135° F. (i.e., 58° C., with an operating range of from about 80° or 26.5° C. to about 145° F. or 63° C.), while the hydrogen side seal oil pressure gauge 142 suitably comprises a range of from 0 to about 160 psig (i.e., 0–11250 grams per square centimeter gauge).

Pressure equalizing valve means 148 is provided to equalize the hydrogen side and air side seal oil pressures, and is coupled to the gauge line 44 via a cutout valve 150, the gauge line 66 via another cutout valve 150, and to a control valve 152 (FIG. 2) which is adapted to control the flow of hydrogen side seal oil through its feed lines 42. For this purpose, the hydrogen side seal oil feed lines 42 also include a stop valve 154 positioned downstream of the control valves 152. In order to determine any differences between the pressure of the seal oil on the air side and the hydrogen side, an air side-hydrogen side differential pressure gauge means 156 is provided between gauge lines 44, 66 and includes appropriate gauge cutout valves 158. A range of from about minus 25 inches H$_2$O to about plus 25 inches H$_2$O (i.e., minus or plus 4.67 centimeters of mercury) has been found to be suitable for the air side-hydrogen side differential pressure gauge means 156, since the normal operating range will vary between plus or minus 2 inches H$_2$O (i.e., plus or minus 0.37 centimeters of mercury). Similar pressure equalizing means 148, air side-hydrogen side differential pressure gauge means 156, etc. may be found on the hydrogen side seal oil feed line 42 which feeds the shaft seal 26 on the turbine-end of the generator 12 (FIG. 4).

Figure 4:
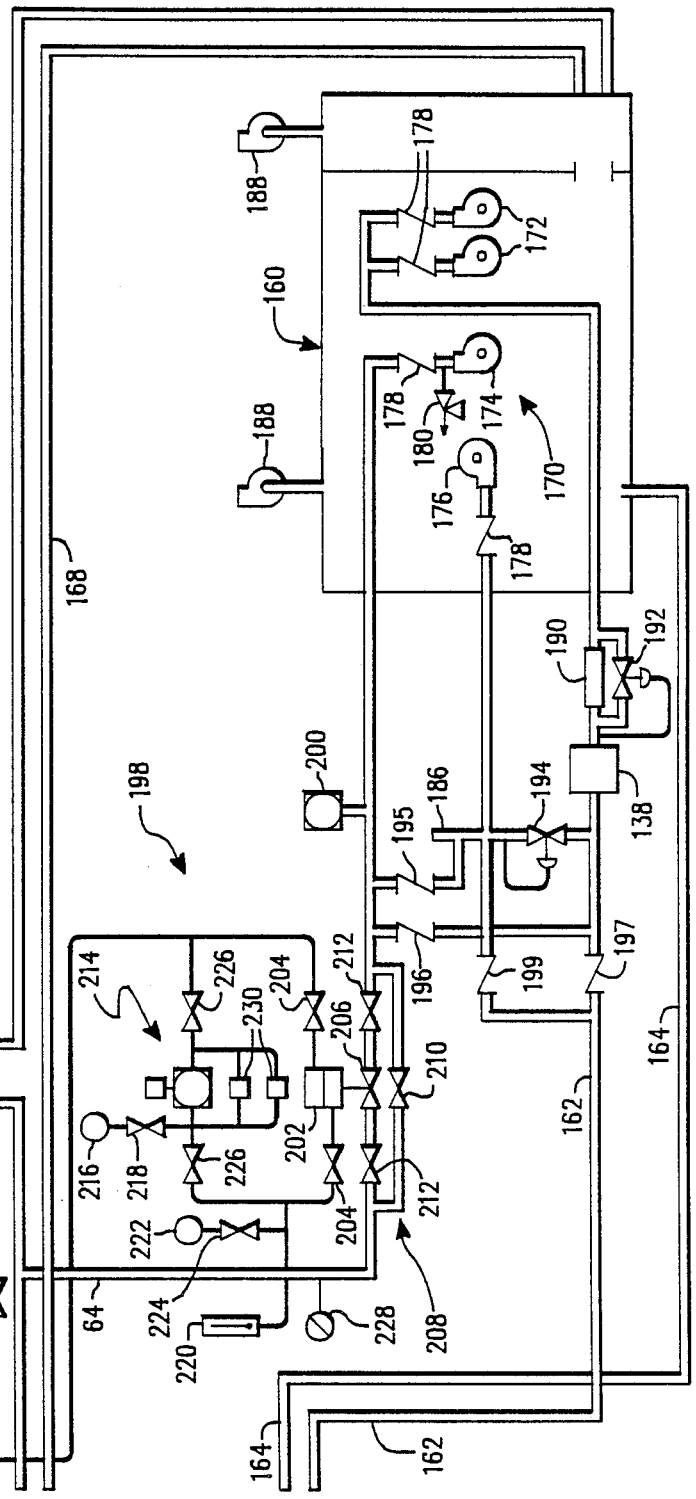
FIG. 4 is a detailed schematic of the second oil supply means shown in FIG. 1.

Referring now more specifically to FIG. 4, there is shown a detailed schematic of the second oil supply means 34 that is shown in FIG. 1. Such second oil supply means 34 comprises a closed loop from a turbine oil reservoir 160, via a second inlet 162 through the hydrogen side seal oil cooler 122 (FIG. 3), out a second outlet 164 from the hydrogen side seal oil cooler (FIG. 3) and back to the turbine oil reservoir 160. As can be seen by reference again to FIG. 3, the second inlet 162 and second outlet 164 each include a stop valve 166.

Referring again to FIG. 4, it can also be seen that turbine oil reservoir 160 is coupled to the tank 78 of the regulator means 76 (FIG. 3) through a drain line 168, and to the air side seal oil drain line 74. Accordingly, when a high level of hydrogen side seal oil causes the control valve 84 to be opened by its float 88 (FIG. 3), the excess hydrogen side seal oil is drained from the tank 78 back to the turbine oil reservoir 160 by way of the drain line 168. Air side seal oil from the sumps 72 (FIG. 2) also drains to the turbine oil reservoir 160 by way of the drain line 74.

Within the turbine oil reservoir 160 is positioned air side seal oil supply means 170 generally comprising a pair of A.C. lube oil pumps 172, a D.C. seal oil pump 174 and a D.C. lube oil pump 176, each of which also include a check valve 178. The D.C. seal oil pump 174 further employs a pressure relief valve 180. Lube oil for main bearings 184 on the shaft 20 (FIG. 2) is provided from the turbine oil reservoir 160 through main bearing feed lines 186. A pair of vapor extractors 188 are coupled to the turbine oil reservoir 160 for purposes of extracting any vapor buildup therein.

By way of the A.C. pumps 172 within the turbine oil reservoir 160, air side seal oil is routed through bearing oil cooler means 190 which includes a temperature control valve 192 and a filter 138. Out of the cooler 190, the seal oil is routed to two places: (1) to an air side seal pressure regulating means 198 via check valve 196; and (2) to the hydrogen side seal oil cooler 122 (FIG. 3) through the second inlet 162 via check valve 197.

Alternatively, the D.C. lube oil pump 176 supplies oil to the main bearings 184 (FIG. 2) via the main bearing feed lines 186 and also to the air side seal pressure regulating means 198, via check valve 195, in case of a failure of the A.C. lube oil pumps 172 to supply these two devices. The D.C. lube oil pump 176 also is capable of providing oil to the second inlet 162 via check valve 199. On the other hand, the D.C. seal oil pump 174 supplies lube oil to the air side seal pressure regulating means 198 through check valve 178 in case of failure of the A.C. lube oil pumps 172 to supply this device. The D.C. seal oil pump 174 is selected to deliver a higher pressure than the D.C. lube oil pump 176. Therefore, the D.C. seal oil pump 174 is the primary backup source of lube oil to the air side seal system, and the D.C. lube oil pump 176 is the primary backup source of lube oil to the main bearing 184 (FIG. 2).

Air side seal oil pressure regulating means 198 is also provided in accordance with the present invention to ensure a proper sealing relationship between the pressures of the seal oil and the hydrogen pressure in the generator 12. A pressure switch 200 downstream of the D.C. seal oil pump 176 is adapted to open when the pressure of the air side seal oil decays past a predetermined minimum. When such pressure switch 200 is opened, it initiates a start of the D.C. seal oil pump 176 to augment the air side seal oil pressure after a predetermined time delay of about a few seconds.

A seal oil pressure regulating means 202 maintains seal oil pressure on the air side at about 6 psi (i.e., about 422 grams per square centimeter) above the hydrogen pressure by sensing the pressure of the gas in the sumps 48 (FIG. 2) through the gas pressure sensing lines 60, each of which include a gauge cutout valve 204, and by operating a control valve 206 for increasing or decreasing the flow of seal oil through the air side seal oil feed lines 64 as necessary. Bypass means 208, including a bypass valve 210 and isolation valves 212 permits bypass of the regulating valve 206 when called for.

The air side seal oil pressure regulating means 198 also includes differential pressure switch means 214 which opens when the pressure of the air side seal oil decreases to about 4 psi (i.e., about 281 grams per square centimeter) above the hydrogen pressure. Upon opening, the differential pressure switch means 214 initiates "SEAL OIL DIFFERENTIAL PRESSURE LOW" alarms, while it also trips, vents and purges the unit. As a redundant feature two pressure transmitters 230 are also provided as a backup to pressure switch 214 for measuring seal oil differential pressure. A test gauge 216 having a gauge cutout valve 218 is also provided to test the differential pressure switch means 214.

An air thermometer 220, and a thermocouple 228 similar to the thermometer 136 and thermocouple 132 shown in FIG. 3, are also provided for detecting the temperature of the air side seal oil leaving the air side seal oil pressure regulating means 198. An air side seal oil pressure gauge 222 with gauge cutout valve 224 likewise is provided for the air side seal oil pressure regulating means 198. Accordingly, the seal oil thermometer 220 suitably comprises a range of from about 30° to about 180° F. (i.e., from about −1° C. to about 82° C.), since the normal oil temperature is about 135° F. (i.e., 58° C., with an operating range of from about 80° or 26.5° C. to about 145° F. or 63° C.), while the air side seal oil pressure gauge 222 suitably comprises a range of from 0 to about 160 psig (i.e., 0–11250 grams per square centimeter gauge). A pair of isolation valves 226 are also provided to isolate the differential pressure switch means 214.

Having already described in detail the apparatus which comprises the present invention, the operation thereof will now be described with reference again to FIGS. 1–4. As can be readily appreciated from FIG. 4, the oil supplied to the air side 30 of each seal ring comes from a common source to the oil supplied to the main bearings 184 (FIG. 2), because they can share the same reservoir 160, pumps 172, 174, 176, and cooler 190. Accordingly, such second oil supply means 34 (FIG. 1) comprising a means for supplying cooled oil to the air side 30 of the seal rings and the main bearings 184 must be sized to accommodate the heat that is rejected by and flow to the hydrogen side seal oil cooler 122 (FIG. 3). Since the quantities of the rejected heat and flow of oil on the hydrogen side are small by comparison to the common flow and heat loads on the bearings and air sides, however, there is a minimum affect on the sizing of the second oil supply means 34.

The hydrogen side seal oil cooler 122 (FIG. 3) is sized so as to be able to deliver seal oil to the hydrogen side 28 of each seal ring at a temperature within 4° F. (i.e., about 2° C.) or less than the temperature of the seal oil to the air side 30 of each seal ring. That is, the first oil supply means 32 according to the present invention is adapted to supply seal oil which is no greater than 4° F. (i.e., about 2° C.) warmer or colder than the seal oil supplied by the second oil supply means 34. Strictly speaking, the "air side seal oil" which is provided to the second inlet 162 of the hydrogen side seal oil cooler 122 is not the same oil that is provided to the air side 30 of each seal 26. Nevertheless, it can be readily appreciated from FIGS. 3 and 4 that the oil which is provided to the hydrogen side seal oil cooler 122 through its second inlet 162, and that which is provided both to the main bearings 184 and the air side 30 of each seal 26 comes from the same cooled supply, which can be assumed to be at equivalent temperatures.

The hydrogen side seal oil cooler 122 is sized for the worst case conditions of 4° F. (i.e., about 2° C.) temperature differences between the first and second oil supply means 32, 34. Performance of the heat exchanger means 36 can, therefore, be expected to improve when lower temperature differences exist. When circumstances cause the hydrogen side seal oil to be cooler than the air side seal oil, the heat exchanger means 36 can also be expected to "heat" such hydrogen side seal oil to maintain it within a preferable 4° F. (i.e., about 2° C.) temperature range of the air side seal oil. The present invention thus "forces" the temperature differences between the hydrogen side seal oil and the air side seal oil to be small under all foreseeable conditions.

Other controls (e.g., the pressure equalizing valve means 148 shown in FIG. 3 and air side seal oil pressure regulation means 198 of FIG. 4) maintain their respective control over the first and second oil supply means 32, 34 in the manners described in greater detail herein above. Moreover, make-up oil for use in the hydrogen side (i.e., the first oil supply means 32) can be quickly provided from the turbine oil reservoir 160 to the tank 78 as controlled by the low level control valve 86.

The heat exchanger means 36 and methods of utilizing same in accordance with the present invention provides a distinct advantage over other known methods and apparatus in that seal oil temperatures can be closely controlled in a simple manner. Because of such careful control over the temperature differentials between the hydrogen side and the air sides of shaft seals, designers of such shaft seals can reduce seal clearances. Any fouling of the heat exchanger is substantially eliminated because clean, non-corrosive fluids (i.e., the hydrogen side seal oil and the air side seal oil) are used therein. Therefore, the heat exchanger means 36 according to the present invention has a longer useful life, and requires lower maintenance and no operator action.

Obviously, many modifications and variations of this invention are possible in light of the foregoing teachings. It is to be understood, therefore, that within the scope of the appended claims, the present invention may be practiced otherwise than as is specifically described herein.

What we claim is:

1. A turbine generator system, comprising:
   a hydrogen inner-cooled generator having a stator with a cylindrical core and a rotor mounted for rotation on a shaft within said cylindrical core;
   a turbine coupled to said shaft at one end of said generator;
   an exciter coupled to said shaft at the other end of said generator;
   a pair of seals each of which surround said shaft at both ends of said generator for substantially minimizing a leakage of hydrogen therefrom, each of said pair of seals having a hydrogen side and an air side;
   first oil supply means for supplying oil to said hydrogen side of each of said pair of seals;
   second oil supply means for supplying oil to said air side of each of said pair of seals; and
   heat exchanger means coupled to said first and second oil supply means for exchanging heat therebetween.

2. The turbine generator system according to claim 1, wherein said turbine comprises a combustion turbine.

3. The turbine generator system according to claim 1, wherein said first and second oil supply means each comprise a closed loop.

4. In a turbine-generator system of the type which includes a hydrogen inner-cooled generator having a stator with a cylindrical core and a rotor mounted for rotation on a shaft within the cylindrical core, and a pair of seals each of which surround the shaft at respective ends of the generator to substantially minimize a leakage of hydrogen from the generator, each seal having a hydrogen side and an air side, the improvement comprising in combination therewith:
   first closed loop oil supply means for supplying oil to the hydrogen side of each seal;
   second closed loop oil supply means for supplying oil to the air side of each seal; and
   heat exchanger means coupled to said first and second closed loop oil supply means for exchanging heat therebetween.

5. The improvement according to claim 4, further comprising a pair of bearings supporting the shaft at respective ends of the generator, each bearing coupled to said second closed loop oil supply means to be lubricated by the oil contained therein.

6. The improvement according to claim 4, wherein said heat exchanger means comprises:
   a first inlet and a first outlet coupled within said first closed loop oil supply means; and
   a second inlet and a second outlet coupled within said second closed loop oil supply means.

7. The improvement according to claim 6, wherein said first closed loop oil supply means comprises:
   an inlet line having one end coupled to a first chamber in the hydrogen side of each seal for supplying oil thereto;
   an outlet line having one end coupled to said first chamber of each seal for draining oil therefrom; and
   pump means coupled to the other end of said outlet line to receive the oil drained from said first chamber, and coupled to the other end of said inlet line for pumping the oil back to said first chamber of each seal.

8. The improvement according to claim 7, wherein said inlet line is coupled to said first inlet and said first outlet of said heat exchanger means.

9. The improvement according to claim 7, further comprising means, coupled in said outlet line, for regulating a drainage of the oil from the hydrogen side of each seal.

10. The improvement according to claim 7, wherein said drainage regulating means comprises:
    a holding tank which includes a first inlet and a first outlet each of which is coupled to said outlet line, a second inlet for providing make-up oil to said holding tank, and a second outlet for draining excess oil from said holding tank;
    means for controlling a level of oil in said holding tank; and
    stop valve means in said first outlet for preventing flow of the oil to said pump means.

11. The improvement according to claim 10, wherein said level controlling means comprises:
    first float means for detecting a low level of oil in said holding tank;
    first normally closed valve means, adapted to be opened by said first float means, for opening said second inlet to provide the make-up oil to said holding tank upon the detection of said low level by said first float means;
    second float means for detecting a high level of oil in said holding tank; and
    second normally closed valve means, adapted to be opened by said second float means, for opening said second outlet to drain said holding tank upon the detection of said high level by said second float means.

12. The improvement according to claim 11, further comprising alarm means connected to said first and second float means for indicating said high and low levels upon their detection by said first and second float means.

13. The improvement according to claim 4, further comprising thermocouple means for determining a temperature differential between the oil in said first closed loop oil supply means and said second closed loop oil supply means.

14. The improvement according to claim 4, further comprising differential pressure means for maintaining a predetermined differential of oil pressure between the oil on the hydrogen side of each said seal and the oil on the air side of each said seal.

15. The improvement according to claim 14, further comprising means for regulating the pressure of air side seal oil.

16. A method of cooling shaft seals in a turbine-generator system of the type which includes a hydrogen inner-cooled generator having a stator with a cylindrical core and a rotor mounted for rotation on a shaft within the cylindrical core, and a pair of shaft seals each of which surround the shaft at respective ends of the generator to substantially minimize a leakage of hydrogen from the generator, each seal having a hydrogen side and an air side, the method comprising the steps of:
    providing first closed loop oil supply means for supplying oil to the hydrogen side of each seal;
    providing second closed loop oil supply means for supplying oil to the air side of each seal; and
    providing heat exchanger means coupled to said first and second closed loop oil supply means for exchanging heat therebetween.

17. The method according to claim 16, further comprising the step of providing valve means to control the flow of oil through said first and second closed loop oil supply means.

18. A method of minimizing leakage of hydrogen from a turbine-generator system having a hydrogen inner-cooled generator with stator, a shaft and shaft seals, each of the shaft seals having a first annular chamber proximate to the stator and a second annular chamber that is longitudinally spaced from the first annular chamber of its respective shaft seal remote from said stator, comprising the steps of:
    providing a first closed loop of oil to the first annular chambers;
    providing a second closed loop of oil to the second annular chambers;
    providing heat exchanger means for exchanging heat between said first and second closed loops;
    monitoring the temperature of said oil in said first closed loop downstream of said heat exchanger means;
    monitoring the temperature of said oil in said second closed loop upstream of said heat exchanger means; and
    providing means for controlling the flow of oil in said first and second closed loops.

19. The method according to claim 18, further comprising the steps of:
    providing means for monitoring the pressure of said oil in said first closed loop means;
    providing means for monitoring the pressure of said oil in said second closed loop means; and
    providing control signals to said controlling means when said pressure monitoring means detect a pressure differential therebetween which exceeds a predetermined range.

20. The method according to claim 18, further comprising the steps of:
    providing a primary reservoir of oil;
    providing regulator means including a secondary reservoir for maintaining a supply of oil for said first closed loop;
    providing level indicating means for said secondary reservoir; and
    providing means for making-up and draining said secondary reservoir to said primary reservoir responsive to said level indicating means.

* * * * *